United States Patent [19]
Barclay et al.

[11] 4,092,637
[45] May 30, 1978

[54] LIQUID ELECTROLYTE TYPE ELECTROCHROMIC DISPLAY DEVICE

[75] Inventors: Donald John Barclay, Winchester; Colin Leonard Bird, Fair Oak, Eastleigh; Michael Henry Hallett, Chandlers Ford; David Horrobin Kirkman, West Moors; John Francis Minshull, Winchester; Charles Edward Owen, Chandlers Ford, all of England

[73] Assignee: International Business Machines Corporation, Armonk, N.Y.

[21] Appl. No.: 683,455

[22] Filed: May 5, 1976

[30] Foreign Application Priority Data

Sep. 30, 1975 United Kingdom .............. 39872/75

[51] Int. Cl.² .............................................. G09F 9/32
[52] U.S. Cl. .................................. 340/324 R; 340/336; 350/357
[58] Field of Search ............... 350/160 R; 340/324 R, 340/324 EC, 336, 324 M, 173 CA; 307/235 A, 235 C, 259

[56] References Cited
U.S. PATENT DOCUMENTS

| | | | |
|---|---|---|---|
| 3,443,859 | 5/1969 | Rogers | 340/324 EC |
| 3,609,747 | 9/1971 | Ngo | 340/324 R |
| 3,839,857 | 10/1974 | Berets et al. | 340/324 EC |
| 3,912,368 | 10/1975 | Ponjee et al. | 340/324 EC |
| 3,938,131 | 2/1976 | Van Doorn et al. | 340/324 EC |

*Primary Examiner*—Marshall M. Curtis
*Attorney, Agent, or Firm*—John A. Jordan; Bernard N. Wiener

[57] ABSTRACT

An electrochromic display device having first and second electrodes, and a plurality of display electrodes, all immersed in a liquid electrolyte. Drive means act to first generate a potential difference between said first and second electrodes to cause a color species to be deposited on said first electrode and, thereafter, act to generate a potential difference between said first electrode and selected ones of said plurality of display electrodes to cause the color species to be transferred to the selected ones of said plurality of display electrodes. Heptyl viologen dibromide is suggested as one possible electrolyte.

11 Claims, 5 Drawing Figures

LIQUID ELECTROLYTE TYPE ELECTROCHROMIC DISPLAY DEVICE

BACKGROUND OF THE INVENTION

1. Field of the Invention

The present invention relates to electrochromic display devices of the liquid electrolyte type. More particularly, the present invention relates to electrochromic display devices of the liquid electrolyte type having a persistent electrochromic effect.

2. Description of the Prior Art

It is known that an electrochromic display may be produced by the passage of electric current through an electrolyte. In solid electrolytes, an electrochromic effect is due to color center absorbing species produced by electrochemical reaction. In liquid electrolytes, the electrochromic effect is due to the deposition of a colored species on one of the electrodes. In known electrochromic displays of this kind, the display electrodes, i.e., the electrodes on which species is deposited to produce the required display, are associated each with a counter electrode at which the opposite electrochemical reaction takes place. Typical of electrochromic display devices and their operating characteristics are those described by I. F. Chang et al in "Performance Characteristics of Electrochromic Displays" appearing in IEEE Transactions on Electron Devices, ED 22, No. 9, Sept. 1975, pp. 749–758.

SUMMARY OF THE INVENTION

In accordance with the principles of the present invention, an electrochromic display device is provided with first and second electrodes immersed in a liquid electrolyte, the electrodes and electrolyte being such that electric current between the electrodes causes a color absorbing species to be deposited on one of the electrodes. In addition, a plurality of display electrodes are also immersed in the electrolyte. Drive means are selectively operable, first to generate a potential difference between the first and second electrodes so that the said species is deposited on the first electrode, and subsequently to generate a potential difference between the first electrode and at least one selected display electrode such that the species is transferred to the selected display electrode or electrodes.

It is, therefore, an object of the present invention to provide an improved electrochromic display device.

It is a further object of the present invention to provide an electrochromic display device which is simplified in design.

It is yet a further object of the present invention to provide an electrochromic display device which exhibits improved performance.

It is yet still a further object of the present invention to provide an electrochromic display device which operates with low voltage.

It is another object of the present invention to provide a matrix display device with dot-shaped display electrodes arranged in rows and columns and a first and second electrode associated with each column of the display.

It is yet another object of the present invention to provide a seven-segment display with each of the seven display electrode segments all commonly associated with a first and second electrode.

The foregoing and other objects, features and advantages of the invention will be apparent from the following more particular description of the preferred embodiments of the invention as illustrated in the accompanying drawings.

DETAILED DESCRIPTION OF THE DRAWINGS

Figure 1:
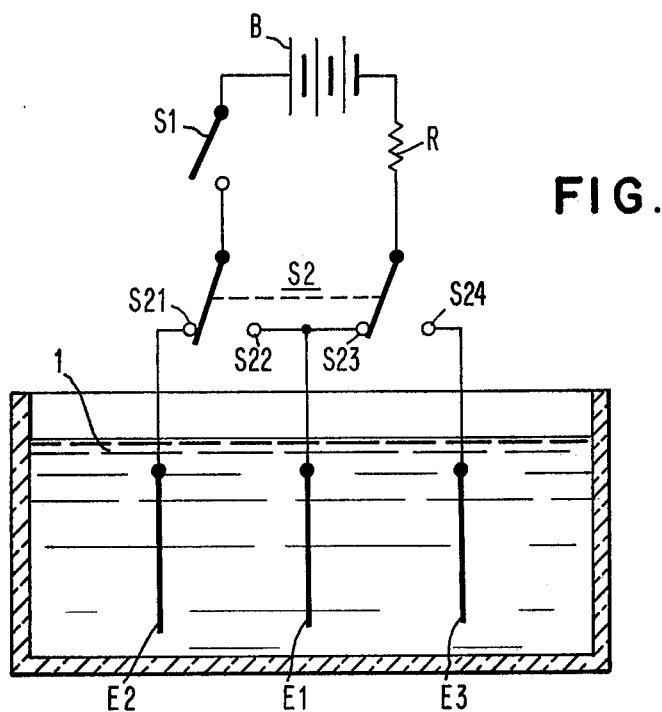
FIG. 1 depicts an arrangement illustrative of the principle of the invention.

FIG. 1 shows three electrodes E1 to E3 in a liquid electrolyte 1 with suitable electrochromic properties. One such electrolyte is heptyl viologen dibromide (N,N' -di-n-heptyl - 4, 4' - bipyridylium dibromide) in which case the electrodes E1 and E3 are of platinum or other inert material and electrode E2 is of silver. A current source, such as battery B and resistor R, is connected to the electrodes through switches S1 and S2. Switch S2 is a ganged switch with two contact areas and respective pairs of contacts S21 and S22, and S23 and S24. With switch S1 closed and switch S2 closed on contacts S21 and S23, electrode E1 is connected to the cathode of battery B and electrode E2 is connected to the anode. An electrochemical reaction occurs which results in the deposition of a colored species C on the electrode E1 (cathode) and the deposition of a colorless or other species C on electrode E2 (anode). If the electrolyte is heptyl viologen dibromide, the reaction at electrode E2 is formation of silver bromide with the reduction of uncolored viologen taking place at electrode E1 leading to the deposition of a colored species on this latter electrode. Upon transferring the contact arms of switch S2 so that electrode E1 is the anode and electrode E3 is the cathode, oxidation at E1 neutralizes the colored species while reduction at E3 causes production of colored species at this electrode. The effect is as if colored species were transferred or shifted from E1 to E3. Since E1 is at the rest potential of the electrochemical reaction, only a small perturbing potential is necessary to cause the "transfer" to E3.

The present invention uses the above-described effect with a plurality of electrodes E3. A shift of colored species between electrode E1 and selected ones of electrodes E3 leads to a selected display. In contrast with known systems, counter electrodes are not required for each of the electrodes E3. As described herein, electrode E1 is called the transfer electrode, electrode E2, the dump electrode and the electrodes E3, the display electrode.

The potentials required are low, lying in the range ½ to 2 volts, but depend upon the design of the driving circuitry. Satisfactory operation has been achieved with potential difference between the electrodes E1 and E2 of 1 volt and E1 and E3 of ½ volt.

Figure 2:
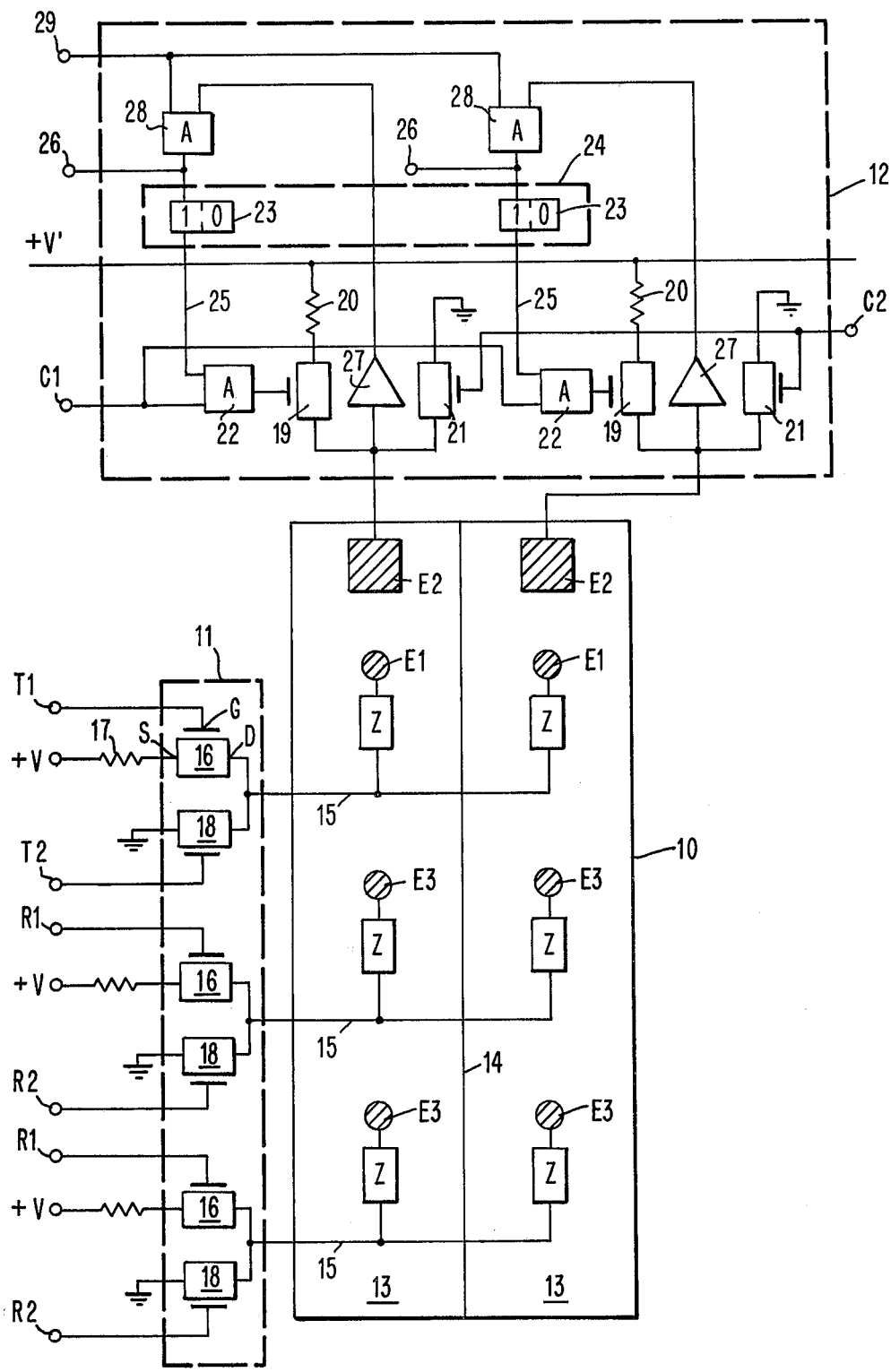
FIG. 2 is a schematic diagram of a matrix display according to the invention.

FIG. 2 is one embodiment of the invention as a matrix display device, that is, a display device in which dot-shaped display elements are arranged in rows and columns. To simplify the figure, only two rows and two columns of display electrodes E3 are shown. The device operates by selective deposition of colored species on the display electrodes E3 and consists of a display panel 10, row control circuitry 11 and column control circuitry 12. The selection is made for each row by activating the transfer and dump electrodes E1, E2, respectively, only in those column positions of the row at which a display is required. Subsequently, a transfer of species from the transfer electrodes E1 to the display electrodes E3 of the row is attempted but only those column positions in which the dump and transfer electrodes were activated will be displayed. This procedure of selection and transfer is repeated for each row of display electrodes until the display is complete.

The display panel 10 consists of a lower sheet of insulating material (not shown) on which the transfer, dump and display electrodes, E1 to E3, respectively are formed. The dump electrodes E2 are connected through the lower sheet to the column control circuitry 12, while the transfer electrodes E1 and display electrodes E3 are connected through the lower sheet to the row control circuitry 11. An upper sheet of glass or other transparent material (not shown) is sealed to the lower sheet so as to enclose a space for the electrolyte. To prevent sneak currents between the columns 13, a dielectric spacer 14 divides the panel into separate columns of electrolyte. Alternatively, the columns 13 may be channels in the lower sheet of the panel.

The control circuitry shown uses as switching elements field effect transistors each having a source electrode S, a drain electrode D and a gate electrode G, as shown by field effect transistor 16 at the top of row control circuitry 11. As is understood by those skilled in the art, the voltage on the gate electrode controls the flow of current between the source and drain electrodes and so determines whether the switch is open or closed. Other equivalent switching elements may readily be used. The control circuitry may be integral with the panel 10 or may be edge-connected in known manner. The polarities of the circuits shown are appropriate to the use of heptyl viologen dibromide as electrolyte. Other electrolytes may require reversed polarities.

Figure 3:
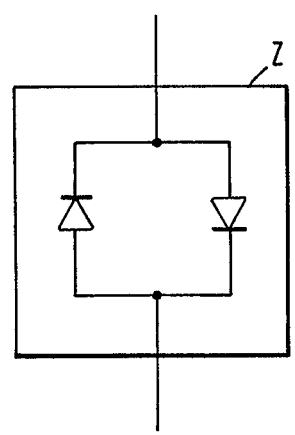
FIG. 3 is one form of non-linear resistive element used in the matrix display of FIG. 2.

Row control circuitry 11 is such as to selectively connect each row of display electrodes E3, or the row of transfer electrodes E1, either to ground potential or to a potential +V. Each transfer electrode E1 preferably, but not necessarily, is connected through a respective non-linear resistance element Z via transfer row conductor 15 to potential +V through transistor 16 and resistor 17, and to ground through transistor 18. The gate electrode of transistor 16 is connected to a control terminal T1, and the gate electrode of transistor 18 is connected to a control terminal T2. The control circuitry of each row of display electrodes E3 is identical, save that the non-linear resistance elements Z are always included (not shown). For convenience, the control terminals for display electrodes E3 (corresponding to T1 and T2 for transfer electrodes E1) have been referenced R1 and R2, respectively. Each non-linear resistance element Z may comprise oppositely connected diodes, as shown in FIG. 3, connected in parallel between the respective transistor drain electrodes and row conductors 15.

Column control circuitry 12 is such as to selectively connect each dump electrode E2 either to ground potential or to a potential +V'. Each electrode E2 is connected to potential +V' through the drain and source electrodes of a respective one of transistors 19 and current determining resistors 20, and is connected to gound through the source and drain electrodes of a respective one of transistors 21. The gate electrodes of all transistors 21 are connected to a terminal C2. The gate electrodes of the transistors 19 are connected to the outputs of respective AND circuits 22. Each AND circuit 22 has two inputs one of which is connected to a terminal C1 and the other of which is connected to the "1" output of respective bistable circuits 23.

As shown, there is one bistable circuit 23 to each column of the display device, which circuits together form an input/output register 24. Such registers are well known and will not be described here. It is sufficient for present purposes to understand that each bistable circuit 23 is capable of being set in either of two stable states, called the "1" state and the "0" state, and that only when the circuit is in the "1" state is an output line 25 activated so as to open the connected AND gate 22 to pass the control signals applied to terminal C1. A particular bistable circuit 23 can be selectively set to the "1" state by a signal on a respective one of terminals 26. Means are provided (not shown) for resetting in known manner all the bistable circuits to the "0" state. FIG. 2 also shows connections whereby the display can automatically be refreshed, as will be described more fully hereinafter.

As an example of operation of the display device of FIG. 2, let it be assumed that display is required at the left-hand electrode E3 of the lower row and both electrodes E3 of the upper row. It is desirable to operate first on the display electrode E3 most remote from the dump and transfer electrodes E2 and E1, respectively. For this reason, in practice, a matrix display would be inverted relative to the arrangement shown in FIG. 2 with the dump and transfer electrodes at the bottom. Initially, a signal is applied to the left-hand bistable circuit 23 to set it in the "1" state. The other (right-hand) bistable circuit is in the "0" state. Signals are then applied simultaneously to terminals C1 and T2 such as to render the associated transistors 18 and 19 conductive. Only the left-hand transistor 19 is activated, since the right-hand AND gate 22 is closed due to the fact that the associated bistable circuit is in the "0" state.

With transistors 18 and 19 conductive, current only flows between the dump electrode E2 and transfer electrode E1 of the left-hand column 13. A balanced electrochemical reaction takes place causing deposition of a colored species C on transfer electrode E1 and a colorless or other species C on dump electrode E2. The signals on C1 and T2 are then terminated, and control signals are applied to terminal T1 and terminal R2 of the lower display row so as to render the respective transistors 16 and 18, controlled thereby, conductive. The colored species C is transferred to display terminal E3 in the left-hand column of the lower row. The signals on T1 and R2 are then terminated, and the left-hand bistable circuit 23 is set to the "0" state. Thereafter, both terminals 26 are activated to set each of the bistable circuits to their "1" state. As before, terminals C1 and T2 are then energized whereupon the states of each of the bistable circuits 23 causes current flow and consequent deposition of species C on both transfer electrodes E1. Finally, in a manner similar to that described above, the species is transferred between respective ones of transfer electrodes E1 and display electrodes E3 of the upper row by energizing terminal T1 and terminal R2 of said upper row.

Erasure is effected by causing between the display electrodes E3 and the dump electrode E2 the reverse electrochemical reaction to that which led to deposition of the species. Terminal C2 is energized to render each of transistors 21 conductive and terminals R1 are successively energized to connect the rows of display electrodes E3 to +V. Alternatively, means may be provided to short-circuit the display and dump electrodes. For example, push-button switches may readily be connected between the row conductors and the conductors connected to the dump electrodes.

Control of the electrochemical reactions between the dump and transfer electrodes can be ensured by providing a reference electrode near each transfer electrode. The use of such an electrode is well-known and will not be described further.

With certain electrolytes and electrode materials chemical diffusion leading to dissipation of the colored species may be a problem. If means are provided to refresh the display, the effect of diffusion is overcome. It is also desirable to be able to read the display into a digital store so that data can be entered by an operator, for example from a keyboard, or an image can be sensed and modified by a computer. When erasure is effected by the first of the two methods described above, current flows from the dump electrode E2 if the display electrode E3 being erased carries a colored species. Accordingly, respective ones of current sense amplifiers 27 of known construction are respectively connected between dump electrodes E2 and AND gates 28, as shown in FIG. 2. The output of each of the respective AND gates 28 is connected to the bistable circuit 23 associated with the respective dump electrodes so that when a sense amplifier is energized, it acts to set the associated one of circuits 23 to its "1" state. The other input to each AND gate 28 is connected to a common control terminal 29. The respective sense amplifiers 27 and corresponding AND gates 28 are functionally equivalent to respective ones of transistors 21, and terminal 29 is equivalent to terminal C2.

In a refresh mode, an erase operation is performed, row by row, by energizing terminals R1 and 29. Erasure of a row is immediately followed by a write operation on the row, i.e., by activation of terminals C1 and T2 and then T1 and R2. If the colored species was erased from a display electrode E3 the associated bistable circuit 23 is in the "1" state and will open gate 22 to permit regeneration of the display. The bistable circuits 23 are reset and the operation repeated for the next row.

Complete erasure is not necessary when only a readout of the display is required. If a bipolar current pulse having a positive excursion followed by a negative excursion (relative to the display electrode) is applied across the dump and display electrodes E2 and E3 in FIG. 2 such that the net total current is zero, the effect is first to cause a small current in the dump electrode if the display electrode is carrying colored species, which current is of such polarity to be detected by associated sense amplifier 27. The negative excursion cancels the effect of the positive excursion and restores the status quo. If the display electrode is not carrying a colored species, reverse reactions take place. Terminal 29 is energized only during the positive excursion of the pulse.

It is undesirable that the dump and transfer electrodes E2 and E1, respectively, be seen by the user. To hide the dump and transfer electrodes, either the mounting of the panel 10 can be such as to cover these electrodes or the top glass sheet can be made opaque at the periphery.

Figure 4:
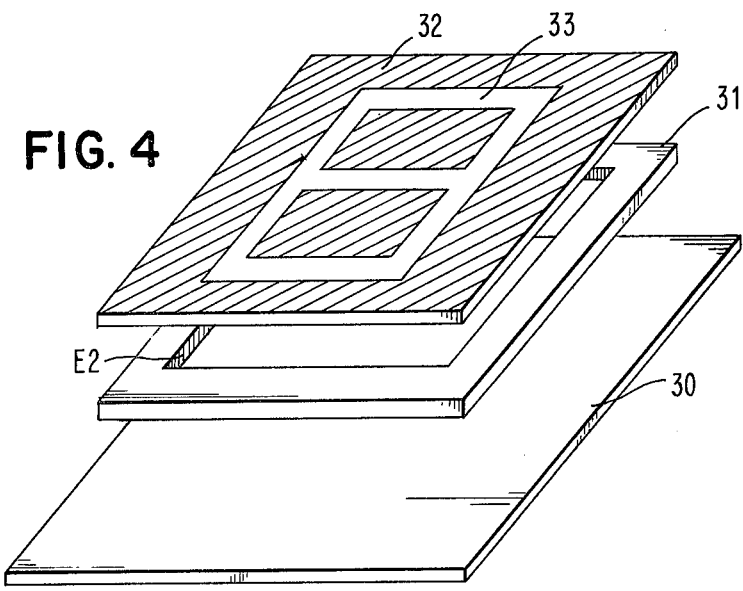
FIG. 4 shows the general structure of a seven-segment display according to the invention.

The display technique according to the invention is particularly suitable for a seven-segment display, which display is typically a display consisting of seven linear display elements arranged in a figure eight. By selective energization of the elements any digit can be displayed. FIG. 4 shows the general structure of a seven-segment display according to the invention, while FIG. 5 shows, in parts, the electrode arrangement.

Referring to FIG. 4, the display and transfer electrodes are formed on a base 30 which is of any material on which the electrodes can be deposited and which does not react with the electrolyte. Glass or a plastics material may typically be used. Above base 30 is a spacer frame 31 which has silver foil dump electrodes E2 on the inner edge and which may have tubes or channels (not shown) let into the side thereof to permit filling the device with electrolyte. The dump electrodes E2 are electrically common and extend around all four inner vertical walls of spacer 31. The device is capped by a transparent glass or plastics material cover 32 which is rendered opaque or masked in the regions illustrated as shaded in FIG. 4, thereby leaving the transparent figure of eight region 33 through which the display is viewed.

Figure 5:
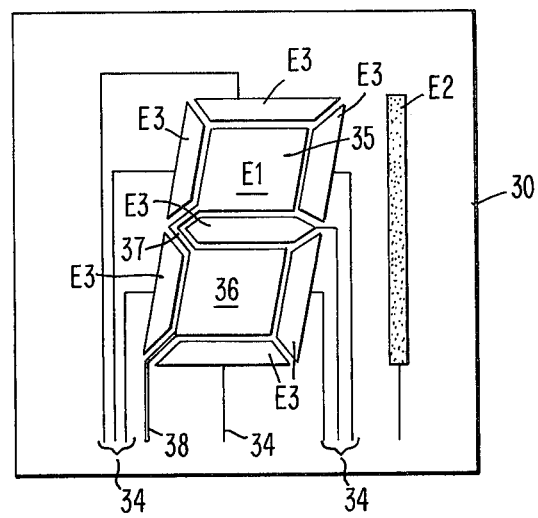
FIG. 5 shows the electrode arrangement of a seven-segment display according to the invention.

As shown in FIG. 5, seven display electrodes E3 are formed on the base 30 in the well-known figure eight pattern. Respective groups of conductors 34 are brought to the edge of base 30 to be edge-connected to drive circuitry. The display electrodes surround a transfer electrode E1 which consists of two regions 35 and 36 joined by a neck 37. A conductor 38 is led to the edge of base 30. The total transfer electrode area of E1 should preferably be at least equal to the total area of the display electrodes E3. To show the relative positions of the dump electrodes E2, one has been shown, for illustrative purposes, in FIG. 5.

With an electrolyte of heptyl viologen dibromide used in the seven segment display shown in FIGS. 4 and 5, platinum display and transfer electrodes E3 and E1, respectively, are used. The electrodes can be deposited on layers of chromium and gold in known manner. The drive circuitry for this arrangement is similar in principle to that described for the matrix display of FIG. 2 and should be capable of selectively making the dump electrode E2 positive relative to the transfer electrode E1 in order to deposit colored species on the transfer electrode, of making the transfer electrode E1 positive relative to selected display electrodes E3 to cause a selected display, and of making display electrodes E3 positive relative to the transfer or dump electrodes to erase the display. Erasure can also be effected by simply connecting the conductors of the display and transfer or dump electrodes together, but the operation is accelerated by the positive potential approach.

Although a specific electrolyte has been described and electrodes suitable thereto suggested, it will be understood by those skilled in the art that the invention can be used with any suitable electrochromic liquid, and that the choice of electrode material is, to the same extent, dependent on the choice of electrochromic liquid.

While the invention has been particularly shown and described with reference to preferred embodiments thereof, it will be understood by those skilled in the art that various changes in form and details may be made therein without departing from the spirit and scope of the invention.

What is claimed is:

1. An electrochromic display device comprising:
   liquid electrolyte means,
   first and second electrode means immersed in said liquid electrolyte means,
      said first and second electrode means and said liquid electrolyte means being such that electric current between said first and second electrode means causes a color absorbing species to be deposited on one of said first and second electrode means and causes another species to be deposited on the other of said first and second electrode means,
   a plurality of display electrodes also immersed in said liquid electrolyte means,
   first drive means selectively operable first to generate a potential difference between said first and second electrode means so that the said species is deposited on said first electrode means, and
   second drive means selectively operable subsequently to generate a potential difference between said first electrode means and at least a selected one of said display electrodes such that the color absorbing species is transferred from said first electrode means to the said at least a selected one of said display electrodes.

2. A display device as set forth in claim 1 wherein said display electrodes comprise a matrix of dot-shaped display electrodes arranged in rows and columns.

3. A display device as set forth in claim 2 wherein said first electrode means comprise a plurality of electrodes respective ones of which are associated with the said columns of said display electrodes such that the transfer of species takes place between the said respective ones of said plurality of electrodes and associated ones of the electrodes of the respective columns of said display electrodes.

4. A display device as set forth in claim 3 wherein said drive means include binary data register means having a plurality of bistable storage elements therein with respective ones of said plurality of bistable storage elements corresponding to columns of said display electrodes, such that said drive means is responsive to the stable states assumed by the respective bistable storage elements to selectively cause deposit or not cause deposit of said species on the respective electrodes of said plurality of electrodes of said first electrode means.

5. A display device as set forth in claim 1 wherein said plurality of display electrodes comprise the respective segments of a seven-segment display arrangement.

6. In an electrochromic display device having a liquid electrolyte and first and second electrodes immersed therein with said liquid electrolyte providing an electrochromic effect in response to electric current between said electrodes, the improvement comprising:
   a plurality of display electrodes also immersed in said liquid electrolyte;
   first means to cause a first potential to be developed between said first and second electrodes to cause a color species to be produced at one of said first and second electrodes and to cause another species to be produced at the other of said first and second electrode means; and
   second means to cause a second potential to be developed between the said one of said first and second electrodes and selected ones of said display electrodes to cause the said color species produced at the said one of said first and second electrodes to be transferred to the said selected ones of said display electrodes.

7. The display device as set forth in claim 6 wherein said plurality of display electrodes comprise the segments of a figure eight pattern seven-segment display arrangement.

8. The display device as set forth in claim 6 wherein said liquid electrolyte comprises heptyl viologen dibromide.

9. The display device as set forth in claim 7 wherein said first and second electrodes comprise transfer and dump electrodes, respectively, with said transfer electrodes being arranged within the openings of said figure eight pattern and with said dump electrodes being arranged behind the viewing side of said figure eight pattern.

10. The display device as set forth in claim 9 wherein said dump electrodes are formed on the vertical walls of the inner periphery of a spacer frame arranged to house said liquid electrolyte.

11. The display device of claim 6 wherein said display electrodes comprise a matrix of dot shaped display electrodes arranged in rows and columns.

* * * * *